June 23, 1959
F. ALEXANDER
2,892,117
VOLTAGE TESTING DEVICE
Filed May 23, 1958
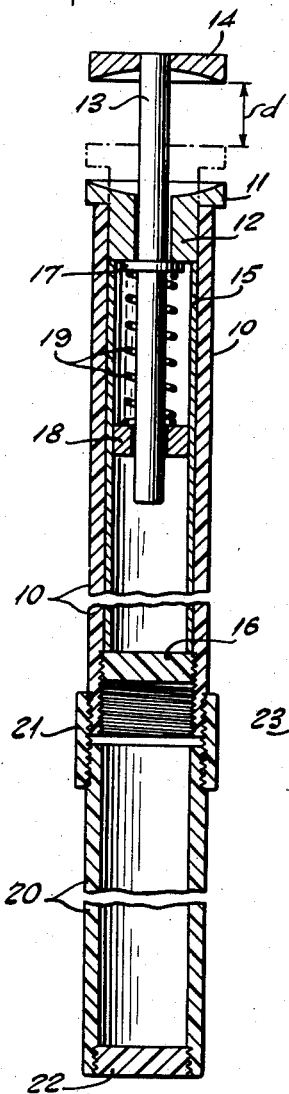
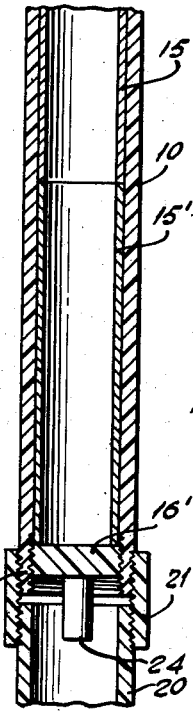
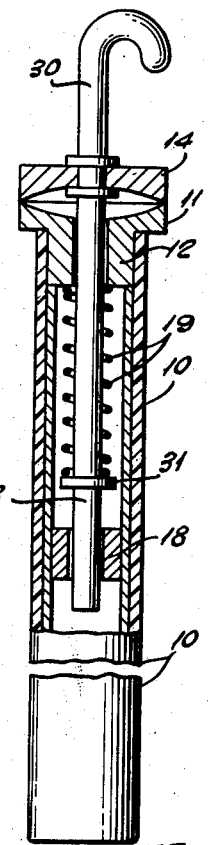
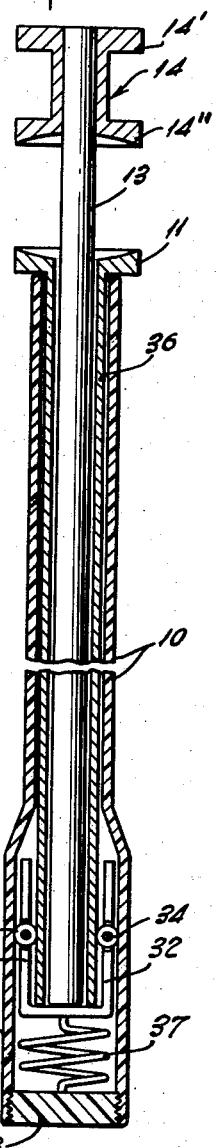
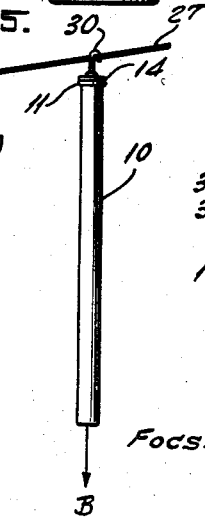
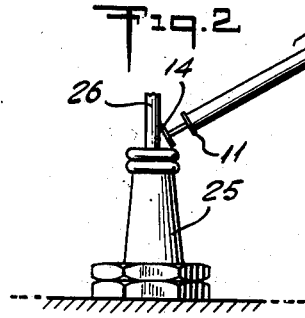
INVENTOR
FOCSANEANU ALEXANDER
BY
ATTORNEY

United States Patent Office 2,892,117
Patented June 23, 1959

2,892,117

VOLTAGE TESTING DEVICE

Focsaneanu Alexander, Flushing, N.Y.

Application May 23, 1958, Serial No. 737,386

12 Claims. (Cl. 313—146)

The present invention relates to testing devices, to indicate or ascertain the presence of electric charge or voltage, more particularly to devices utilizing an open-air spark as a visual and/or audible indicating means of a voltage to be tested or indicated.

An object of the invention is the provision of a voltage indicator or testing device utilizing an electric spark as an indicating means, which is both simple in design and construction as well as reliable and safe in operation.

Voltage indicators have already become known which utilize a monopolar ionic or gas discharge tube having an electrode connected to a probe which is brought into contact with a voltage-carrying part or member to be tested, whereby to cause a luminous discharge by ionization of the gas by the electric field, resulting in a visual indication of the voltage being tested. The use of ionic or gaseous voltage indicators, among other drawbacks and defects, has the disadvantage that wrong or erroneous indications may occur due to breakage, change in gas pressure or leakage, as well as other causes or defects of the gaseous discharge tube. Thus, a defective tube may indicate the absence of voltage on a part actually under high tension, with serious consequences liable to result from such erroneous indication, as will be understood.

Accordingly, a more specific object of the invention is the provision of an improved voltage testing device or high tension indicator, utilizing an open-air spark discharge between a pair of isolated electrodes as a visual as well as audible indicating means, substantially without danger to the operator, while enabling the indication of the presence of an electric voltage or charge to be effected positively and reliably.

Yet another object of the invention is the provision of a voltage indicator of the above character which may be adjusted for use within different ranges of operating voltage, to extend the usefulness of the device and to increase the efficiency and reliability of the voltage indication.

While the voltage indicator according to the present invention is especially suitable for use with A.C. voltages, its usefulness is not limited thereto and may be extended to the indication of D.C. voltages, as will become apparent and understood from the following.

The invention, as to its ancillary objects and novel aspects, will be better understood from the following detailed description taken in reference to the accompanying drawing, forming part of this specification and wherein:

Fig. 1 is a cross-sectional view of a preferred voltage indicator constructed in accordance with the principles of the invention;

Fig. 2 is a schematic view illustrative of the operation or use of the device shown by Fig. 1;

Fig. 3 is a partial view of Fig. 1, illustrating a feature of improvement of the invention;

Fig. 4 is a cross-section similar to and showing a modification of the voltage indicator shown by Fig. 1;

Fig. 5 is a schematic view illustrative of the operation and use of the indicator shown by Fig. 4; and Fig. 6 is a cross-sectional view of still another modification of a voltage indicator constructed according to the invention.

Like reference numerals denote like parts in the different views of the drawing.

With the foregoing objects in view, the invention involves generally the provision of a first electrode or probe mounted upon an insulating support, such as a rod, pole or the like, and adapted to be brought into contact with a part or member carrying an electric charge or voltage to be tested or indicated, and a second cooperating and electrically floating electrode also mounted upon said support. According to one embodiment, the second also insulated electrode is normally urged to a position spaced from said first electrode, whereby to be charged by the latter by electric induction, upon placing the first electrode in contact with a part carrying a charge or voltage to be indicated, the spacing distance between the electrodes being such as normally to prevent a spark or discharge therebetween. The device comprises further means to cause said electrodes to be gradually approached towards one another, such as by exerting a push or pull upon said support, until reaching a predetermined distance or gap, corresponding to the sparking distance for a given voltage being tested, in such a manner as to result in the initiation of a visible as well as audible open-air spark, serving as an indicating means of the voltage being tested or indicated.

Due to the relatively small charge upon the floating electrode produced by electric induction from the cooperating electrode or probe, a relatively weak spark discharge occurs between the electrodes upon reaching the critical or sparking distance, sufficient to serve as a simple and efficient indicating means of the charge or voltage being tested. Furthermore, due to the fact that the second electrode is electrically floating or isolated from the ground, heavy and dangerous discharge currents are principally avoided by the invention.

A device of this type is especially suitable for testing or indicating A.C. voltages at present being almost exclusively used in electrical power systems or networks. In this case, the polarity of the charge induced upon the floating electrode by the probe electrode is reversed periodically at the frequency of the operating voltage, whereby to result in a series of successive elementary sparks giving the appearance of a practically continuous discharge or noise indicative of the voltage being indicated, as long as the probe electrode is maintained in contact with the part or member being tested. In testing D.C. voltages, the probe may be discharged to ground to remove residual charges, to enable repeated operation of the testing device.

Alternatively, the floating electrode may be urged to a normally engaged position with the probe electrode and separated from the latter during use by applying a force upon the device in the operating position, to cause a spark discharge for visual as well as audible indication of the voltage being tested.

Referring more particularly to Fig. 1 of the drawing, there is shown, by way of example, a voltage tester or indicating device constructed in accordance with the invention and comprising a hollow tube or pole 10 of insulating material having mounted at one end thereof an electrically isolated or floating electrode 11 provided with a sleeve 12 fitting the inside of the tube 10 and being secured thereto in any suitable manner, such as by screws, press fit, or in any suitable manner. Further mounted upon the end of an insulating rod 13 concentric and slidable within the tube 10, is a cooperating electrode or proble adapted to be brought in contact with the part or member carrying an electric charge or voltage to be tested, such as a high voltage conductor 26 supported by an insulator or bushing 25 as shown in Fig. 2. Rod 13 is slidably mounted within a bore of the electrode 11 and sleeve 12 and is further guided by a metal washer 18 secured to the inside of a concentric metal tube 15 mounted within the tube 10 and being electrically connected with the sleeve 12 of the electrode 11.

The probe 14 is normally urged, in the example shown, to a position spaced from the electrode 11 by the action of a compression spring 19 encircling the rod 13 and having one end engaging the washer 18 and having its opposite end engaging a sleeve or collar 17 secured to or integral with the rod 13, in such a manner as to urge the rod and probe 14 to a position with the collar 17 abutting against the sleeve 12 and with the electrodes 11 and 14 being spaced from one another, as shown in the drawing.

The metal tube 15, which serves to increase the dimension or capacity of the floating electrode 11, may be secured in any suitable manner, such as by a threaded insulated washer 16 engaging an internal threaded portion of the tube 10 and being tightly screwed against the edge of the tube 15, to effect a firm mechanical and electrical contact or engagement with the sleeve 12 of the electrode 11. If desired, the tube 10 may be fitted with a removable extension 20 secured thereto by an internally threaded sleeve 21 and having its end closed, such as by an insulating disc or washer 22 or in any other suitable manner.

In operation, the device is applied with the probe 14 engaging the part or member to be tested, as shown in Fig. 2, whereby an electric charge will be induced upon the floating electrode 11, in a manner well known and understood. The size or capacity of the electrode 11, including the sleeve 12 and tube 10, are such or related to the normal distance between the electrodes, as to prevent a spark discharge for a given operating voltage or voltage range for which the indicator has been designed. If now the rod 10 is pushed towards or against the part or member 26 being tested, as indicated by the arrow A in Fig. 2, the electrode 11 is approached towards the probe 14 against the action of the spring 19, as indicated in dotted lines in Fig. 1, until reaching the critical or sparking distance $d$ between the electrodes. As a result a spark discharge occurs between the electrodes, serving as a visual as well as audible indicating means of the charge or voltage being tested. Upon release of the pressure A, the device returns to its original position, ready for repeated operation or testing in the manner described. Any residual charge left upon the electrode 11 and connected metal parts 12 and 15, especially in the case of a D.C. voltage, may be either allowed to leak off through the atmosphere or insulating resistance of the device, or may be removed instantly by short-circuiting the electrode to ground.

In order to enable the device to be used within an extended range of operating voltages, say, for example, from 500 to 100,000 volts, without excessive variation of the sparking distance $d$ between the electrodes 11 and 14, the dimension or capacity of the electrode 11 may be made adjustable, according to an improved feature of the invention. An arrangement of this type is shown, by way of example in Fig. 3. In the latter, the metal tube forming parts of the floating electrode 11 is divided into two parts 15 and 15' being normally urged to a position to engage one another, as shown in the drawing, whereby to provide a relatively large electrode or capacity. In this case, the device is especially suitable for the indication of relatively low voltages, say from 500 to 10,000 volts, without reducing the sparkng distance $d$ to a value liable to impair the visual and/or oral indication.

For the higher voltages, that is, from 5,000 to 100,000 volts, in the example mentioned, the two portions 15 and 15' of the metal tube are separated, to reduce the size or capacity of the floating electrode. This may be accomplished in any suitable manner, such as by mounting the tube 15' upon a washer 16' engaging a threaded internal portion of the tube 10. Washer 16' may have an extension for rotating the same manually or by means of a screw driver, to effect engagement or disengagement of the tube portions 15 and 15', as will be readily understood. Other means readily suggesting themselves to those skilled in the art may be provided to enable more than two adjustments of the size of the tube 15 or floating electrode, to suit existing conditions and requirements.

Referring to the Fig. 4 modification, this differs essentially from the Fig. 1 by the upper end of the spring 19 engaging the sleeve 12 and by the lower end of the spring engaging a collar 31 upon the rod 13. As a result, the two electrodes 11 and 14 are normally urged into engaged position, as shown in the drawing, whereby to allow the device to be operated by exerting a pulling force, rather than by push as in the case of Fig. 1. This renders the device especially suitable for testing high-voltage lines, as shown at 27 in Fig. 5. For this purpose, the electrode 14 is shown provided with a hook-shaped extension 30 adapted to engage the line 27. By pulling the rod or pole in the direction of the arrow B, the electrodes 11 and 14 will be separated against the action of the spring 19. The distance between the electrodes may be so adjusted as to produce an easily visible spark and audible indication, the operation being otherwise substantially the same as in the case of the preceding illustration.

Referring to Fig. 6, there is shown still another modification of the invention utilizing a pulling force for the operation of the indicator, but where the electrodes are normally separated in the manner as shown by Fig. 1. For this purpose, the probe electrode 14 has a pair of spaced extensions or flanges 14' and 14", to enable engagement by the line 27, Fig. 5. The insulating rod carrying the proble 14 has secured to its inner end a pair of brackets or supports 32 and 33 which may be in the form of a single U-shaped bracket or the like, as shown in the drawing. Each of the supports carries a friction roller 34 and 35, respectively, rotatably mounted thereon and engaging the inner metal tube 36, corresponding to the tube 15 of the previous figures and being slidably mounted upon the rod 13, on the one hand, and the inside of the enlarged end portion 10' of the insulating tube 10, on the other hand. The tube 36 is secured to or integral with the floating electrode 11. There is further provided a tension spring 37 having one end secured to the inner end of the rod 13 and having its opposite end secured to the member 10' through a closure disc 38, or in any other suitable manner.

In operation, a pull on the rod 10 in the direction of the arrow B, Fig. 5, results in the tube 10 sliding downwardly over the metal tube 36, whereby to rotate the friction rollers 34 and 35 which, in turn, by engaging the tube 36 cause a displacement of the latter in an upward direction relative to the rod 13. This again causes the electrodes 11 and 14 to approach one another to the sparking distance $d$, in substantially the same manner as described hereinbefore. Other modifications and arrangements for operating the electrodes 11 and 14 will be evident to those skilled in the art.

In the foregoing the invention has been described with reference to a specific illustrative device. It will be evident, however, that variations and modifications, as well as the substitution of equivalent parts or elements for those shown herein, may be made without departing from the broader scope and spirit of the invention as set forth in the appended claims. The specification and drawing are accordingly to be regarded in an illustrative rather than in a limiting sense.

I claim:

1. A device for testing high voltage power lines comprising an insulating support, a pair of electrodes mounted at one end of said support, one of said electrodes constituting a probe adapted to be brought into engagement with a high voltage-carrying part to be tested and the other of said electrodes being electrically floating with respect to said first electrode and ground, and means to vary the spacing distance of said last electrode relative to said probe electrode by a force applied between said support and the part being tested in the operative position of said device with said probe electrode engaging said parts.

2. A voltage indicator as claimed in claim 1, including a conductive extension of said second electrode, and means to adjust the size of said extension.

3. A device for testing high voltage power lines comprising an insulating support, a pair of electrodes mounted at one end of said support, resilient means to normally urge said electrodes to a position spaced from one another by a predetermined distance, one of said electrodes constituting a probe adapted to be brought into engagement with a high voltage-carrying part to be tested and the other of said electrodes being electrically floating, said predetermined distance being less than the electric sparking distance between said electrodes, and means to reduce the distance between said electrodes by a force applied between said support and the part being tested against the action of said resilient means in the operative position of said device with said probe engaging said part.

4. A device for testing high voltage power lines comprising an insulating support, a pair of electrodes mounted at one end of said support, resilient means to normally urge said electrodes to engaged position with one another, one of said electrodes constituting a probe adapted to be brought into engagement with a voltage-carrying part to be tested and the other of said electrodes being electrically floating in respect to said first electrode and ground, and means to operate said electrodes to a varying spacing distance from one another by a force applied between said support and the part being tested against the action of said resilient means in the operative position of said device with said probe engaging said part.

5. A device for testing high voltage power lines comprising an insulating pole, a probe electrode mounted upon one end of said pole, an electrically floating electrode isolated from ground and relatively movably mounted upon said rod, resilient means to normally urge said electrodes to a predetermined position one relative to the other, and means to control the spacing distance between said electrodes by a force applied to said probe electrode against said resilient means in the operative position of said device with said probe electrode engaging a part to be tested.

6. A voltage indicator as claimed in claim 5, said resilient means normally urging said floating electrode to a position spaced from said probe electrode by a distance greater than the sparking distance between said electrodes.

7. A voltage indicator as claimed in claim 5, said resilient means normally urging said floating electrode to a position of engagement with said probe electrode.

8. A device for testing high voltage power lines comprising a hollow insulating tube, a first electrically floating electrode isolated from ground and mounted at one end of said tube, an insulating rod concentric to and slidably mounted within said tube, said rod passing through and extending outwardly from said floating electrode, a probe electrode mounted upon the end of said rod, resilient means between said rod and tube, to normally urge said electrodes to a predetermined position relative to one another, whereby to vary the spacing distance between said electrodes by a force applied to the opposite end of said tube in the operative position of said device with said probe electrode engaging a voltage-carrying part to be tested.

9. A voltage indicator as claimed in claim 8, wherein said electrodes are normally urged to a spacing distance greater than the electric sparking distance therebetween, whereby to reduce said distance by pressure applied to said tube.

10. A voltage indicator as claimed in claim 8, wherein said electrodes are normally urged to engaged position, whereby to separate said electrodes by a pull applied to said tube.

11. A voltage indicator as claimed in claim 8, including a metal tube mounted within said insulating tube in electrical contact with said floating electrode.

12. A voltage indicator as claimed in claim 11, including means to adjust the effective length of said metal tube.

References Cited in the file of this patent

UNITED STATES PATENTS

| | | |
|---|---|---|
| 1,422,742 | Cook | July 11, 1922 |
| 1,803,226 | Willis | Apr. 28, 1931 |
| 1,952,259 | Karr | Mar. 27, 1934 |
| 2,213,297 | Zitzmann | Sept. 3, 1940 |
| 2,482,017 | McCoy | Sept. 13, 1949 |
| 2,552,678 | Hirbec | May 15, 1951 |